United States Patent
Rajasekharan et al.

(10) Patent No.: US 11,107,113 B2
(45) Date of Patent: Aug. 31, 2021

(54) MULTITRACK PERFORMANCE SCORING FOR ASSETS COMPRISING DIGITAL MEDIA

(71) Applicant: Brandfolder, Inc., Denver, CO (US)

(72) Inventors: Ajaykumar Rajasekharan, Longmont, CO (US); Logan Sears, Denver, CO (US); Jim Hanifen, Denver, CO (US); Brett Nekolny, Denver, CO (US); Luke Butterfield Beatty, Denver, CO (US)

(73) Assignee: Brandfolder, Inc., Denver, CO (US)

( * ) Notice: Subject to any disclaimer, the term of this patent is extended or adjusted under 35 U.S.C. 154(b) by 37 days.

(21) Appl. No.: 16/129,312

(22) Filed: Sep. 12, 2018

(65) Prior Publication Data
US 2020/0082431 A1 Mar. 12, 2020

(51) Int. Cl.
*G06Q 30/02* (2012.01)
(52) U.S. Cl.
CPC .............. *G06Q 30/0242* (2013.01)
(58) Field of Classification Search
CPC ............................ G06Q 30/0242
See application file for complete search history.

(56) References Cited

U.S. PATENT DOCUMENTS

| | | | | |
|---|---|---|---|---|
| 9,002,858 B1* | 4/2015 | Dassa | ................. | G06F 16/335 707/750 |
| 9,075,882 B1* | 7/2015 | Ward | ................. | G06Q 30/0631 |
| 9,082,047 B2* | 7/2015 | Marchesotti | ........... | G06K 9/627 |
| 9,661,087 B1* | 5/2017 | Lewis | ................. | H04L 67/22 |
| 9,898,748 B1* | 2/2018 | Taylor | ............... | G06Q 30/0201 |
| 2005/0125397 A1* | 6/2005 | Gross | .................... | G06F 16/334 |
| 2007/0257795 A1* | 11/2007 | Overhultz | ............ | G01S 5/0252 340/572.1 |
| 2009/0048860 A1* | 2/2009 | Brotman | ............. | G06Q 20/123 700/26 |
| 2009/0138505 A1* | 5/2009 | Purdy | ................. | G11B 27/105 |
| 2009/0158340 A1* | 6/2009 | Patel | ..................... | G06Q 10/00 725/46 |

(Continued)

OTHER PUBLICATIONS

Facebook, "Showing Relevance Scores for Ads on Facebook," Feb. 11, 2015, online at www.facebook.com/business/news/relevance-score, retrieved on Jul. 16, 2018.

(Continued)

*Primary Examiner* — Arthur Duran
(74) *Attorney, Agent, or Firm* — Duft & Bornsen, PC

(57) ABSTRACT

Systems and methods are provided for determining the efficacy of digital assets provided to an audience. One embodiment is a system that includes a brand management server. The brand management server includes a memory that stores assets comprising digital media. The brand management server also includes a controller. The controller distributes the assets for consumption by members of an audience at remote devices. The controller also selects one of the assets, determines a look-back period, acquires metrics indicating at least two different types of consumption of the asset by the audience during the look-back period, and calculates an asset score for the asset that indicates a popularity of the asset and is based on the metrics indicating the at least two different types of consumption.

24 Claims, 11 Drawing Sheets

(56) References Cited

U.S. PATENT DOCUMENTS

| | | | | |
|---|---|---|---|---|
| 2010/0121682 A1* | 5/2010 | Abboa-Offei | .......... | G06Q 10/00 |
| | | | | 705/7.33 |
| 2012/0290373 A1* | 11/2012 | Ferzacca | ................ | G06Q 10/00 |
| | | | | 705/14.7 |
| 2013/0066885 A1* | 3/2013 | Komuves | ............... | G06Q 10/10 |
| | | | | 707/748 |
| 2013/0073568 A1* | 3/2013 | Federov | ................. | G06Q 50/01 |
| | | | | 707/749 |
| 2013/0188866 A1* | 7/2013 | Obrador | ................ | G06T 7/0002 |
| | | | | 382/165 |
| 2015/0058079 A1* | 2/2015 | Freund | ............... | G06Q 30/0202 |
| | | | | 705/7.31 |
| 2017/0195447 A1* | 7/2017 | Panagos | .............. | H04L 67/2842 |
| 2017/0294010 A1* | 10/2017 | Shen | ..................... | G06T 7/0002 |

OTHER PUBLICATIONS

Alcantarilla, Pablo F., Bartoli, Adrien, Davison Andrew J., "Kaze Features," ISIT-UMR 6284 cnrs, Universite d'Auvergne, Clemont Ferrand, France, undated.

Amazon, "What is a data lake," undated, online at aws.amazon.com/big-data/datalakes-and-analytics/what-is-a-data-lake, retrieved on Jul. 17, 2018.

\* cited by examiner

ASSET SCORING SYSTEM

ASSET SCORE TRACKING

ASSET FEATURE LISTING

BRAND METRIC PROCESSING

BRAND SCORING

MULTITRACK PERFORMANCE SCORING FOR ASSETS COMPRISING DIGITAL MEDIA

FIELD

The disclosure relates to the field of provisioning digital content, and in particular, to scoring digital content based on the manner in which the digital content has been accessed and/or utilized by an audience.

BACKGROUND

Brand managers (e.g., a Chief Marketing Officer (CMO) of a company, a designer, artist, etc.) help to ensure a desired level of public awareness for one or more brands. For example, brand managers may coordinate the distribution of assets (i.e., digital media such as a video, image, text, audio, etc.) that advertise a brand's existence to an audience of potential customers. When the asset is consumed (e.g., viewed) by members of the audience, public awareness of the brand may be beneficially increased.

A brand manager may administer hundreds or thousands of assets for each of multiple brands, and many assets within a brand may be highly similar to each other. For example, different assets may comprise different resolutions of a video or image, a slightly altered version of a video or image, etc. While it may be beneficial to have numerous assets available, this may also cause a brand manager to encounter difficulty when determining which asset is optimal for a given advertising opportunity.

Further compounding this issue, the success of a brand is often judged based on the commercial success of associated products. However, sales data for products is slow to retrieve, sales are impacted by other factors than advertising, and it may take time for changes in advertising to alter consumer behavior in a manner that impacts sales. This means that for many brand managers, it may be difficult if not impossible to determine the effectiveness of individual assets in improving brand awareness.

Hence, those who manage brands continue to seek out enhanced systems and methods for achieving these goals.

SUMMARY

Embodiments described herein provide brand management tools that are capable of quantitatively assessing the worth of a given asset (an "asset score"), based on multiple types of metrics indicating how the asset is being consumed by an audience. This allows a brand manager to rapidly determine which assets for a brand provide the greatest amount of value for a given audience. The techniques described herein also enable a brand manager to track an asset's score over time, to aggregate scores of assets to determine a value of an entire brand, and to predictively estimate scores for newly created assets. Thus, the systems and methods described herein provide a benefit by enabling quantitative analysis and evaluation of asset consumption in a dynamic and holistic fashion.

One embodiment is a system that includes a brand management server. The brand management server includes a memory that stores assets comprising digital media. The brand management server also includes a controller. The controller distributes the assets for consumption by members of an audience at remote devices. The controller also selects one of the assets, determines a look-back period, acquires metrics indicating at least two different types of consumption of the asset by the audience during the look-back period, and calculates an asset score for the asset that indicates a popularity of the asset and is based on the metrics indicating the at least two different types of consumption.

A further embodiment is a method. The method includes storing assets comprising digital media, and distributing the assets for consumption by members of an audience at remote devices. The method also includes selecting one of the assets, determining a look-back period, acquiring metrics indicating at least two different types of consumption of the asset by the audience during the look-back period, and calculating an asset score for the asset that indicates a popularity of the asset and is based on the metrics indicating the at least two different types of consumption.

Yet another embodiment is a non-transitory computer readable medium embodying programmed instructions which, when executed by a processor, are operable for performing a method. The method includes storing assets comprising digital media, and distributing the assets for consumption by members of an audience at remote devices. The method also includes selecting one of the assets, determining a look-back period, acquiring metrics indicating at least two different types of consumption of the asset by the audience during the look-back period, and calculating an asset score for the asset that indicates a popularity of the asset and is based on the metrics indicating the at least two different types of consumption.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description depict specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Systems and Components

Figure 1:
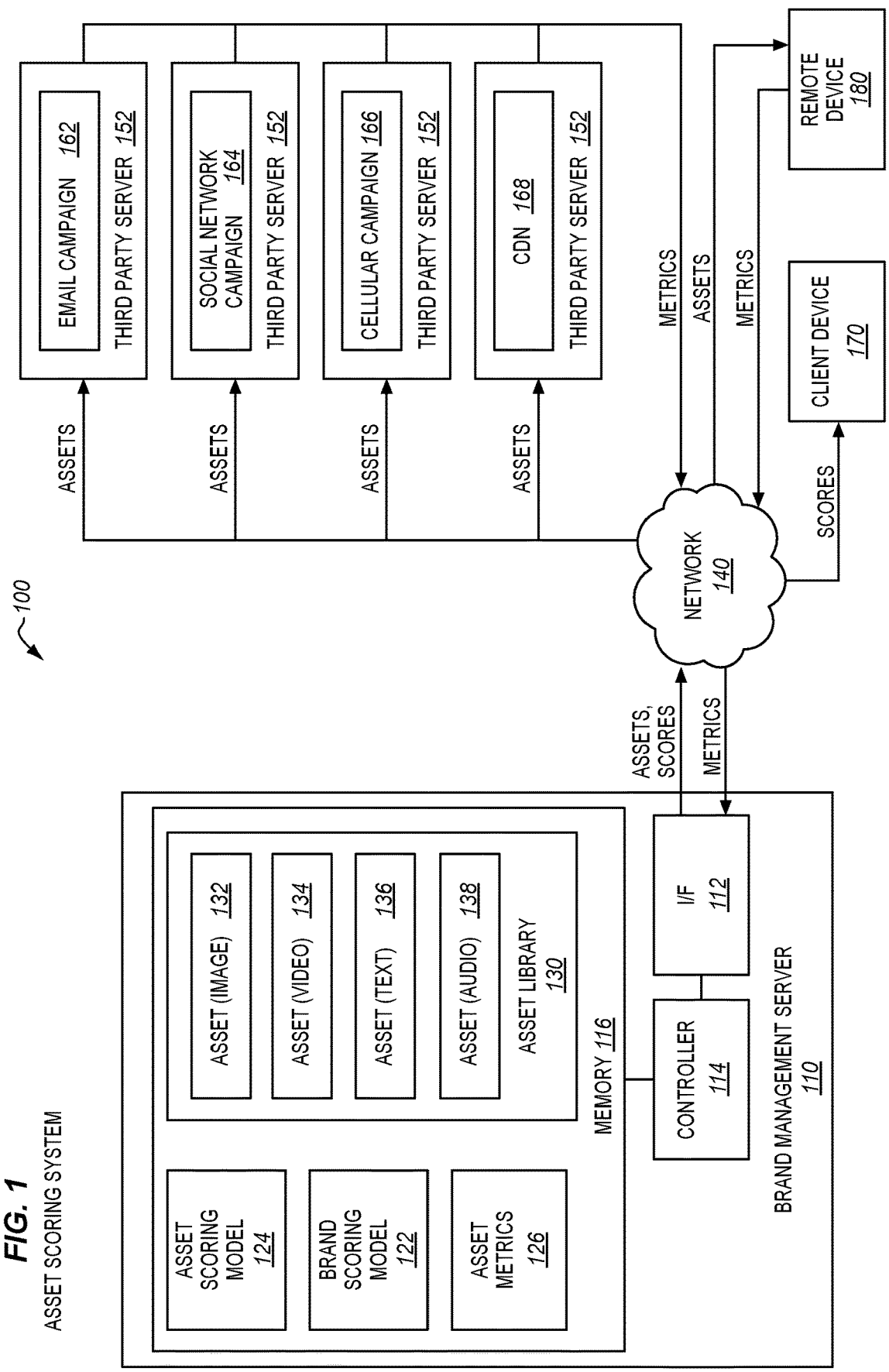
FIG. 1 is a block diagram depicting an asset scoring system in an illustrative embodiment.

FIG. 1 is a block diagram depicting an asset scoring system 100 in an illustrative embodiment. Asset scoring system 100 comprises any system, component, or device that is capable of scoring assets based on metrics indicating how those assets were consumed by an audience. Asset scoring system 100 may also distribute assets for consumption by an audience.

In this embodiment, asset scoring system 100 includes brand management server 110, which distributes assets to third-party servers 152 and/or remote devices 180 via network 140 (e.g., the Internet). Third-party servers 152 may further distribute assets to audience members at remote devices 180 via email campaign 162, social network campaign 164, cellular campaign 166, and/or Content Delivery Network (CDN) 168. Brand management server 110 receives metrics indicating the consumption of assets being distributed, and assigns scores to individual assets based on these metrics. Assets 132-138 within brand management server 110 may be accessed, modified, and/or updated based on input from a user (e.g., a brand manager) operating client device 170.

Brand management server 110 comprises interface (I/F) 112, controller 114, and memory 116. I/F 112 may comprise any suitable physical interface for receiving data, such as an Ethernet interface, Universal Serial Bus (USB) interface, an interface compliant with Institute of Electrical and Electronics Engineers (IEEE) 802.11 protocols, etc. Controller 114 manages the operations of brand management server 110 in distributing and/or evaluating assets. Thus, controller 114 may select assets for distribution, may determine which metrics of consumption to collect from other entities (e.g. third-party servers 152 or remote devices 180), may calculate asset scores, etc. Controller 114 may be implemented, for example, as custom circuitry, as a hardware processor executing programmed instructions, or some combination thereof.

Memory 116 stores asset library 130, which comprises a collection of assets for one or more brands. Asset library 130 may include asset 132 (an image), asset 134 (a video), asset 136 (text), asset 138 (audio), etc. While only four assets are illustrated in FIG. 1, any suitable number of assets may be stored in asset library 130, and these assets may be categorized based on brand, shared features, etc. Memory 116 also includes asset scoring model 124, which is utilized to determine the asset scores of individual assets based on asset metrics 126. Asset scoring model 124 may comprise, for example, a formula that applies weights to various metrics of consumption, a machine learning model (e.g., neural network), etc. Memory 116 further stores brand scoring model 122. Brand scoring model 122 includes a formula or machine learning model for calculating the score of a brand comprising a group of assets. Memory 116 may be implemented as a digital storage device such as a hard disk, flash memory, optical disc, etc.

Asset Score Calculation

Illustrative details of the operation of asset scoring system 100 will be discussed with regard to FIG. 2. Assume, for this embodiment, that a user (e.g., a brand manager) has accessed brand management server 110 via client device 170, and has uploaded a set of assets for distribution. For example, the assets may all be related to the same brand.

Figure 2:
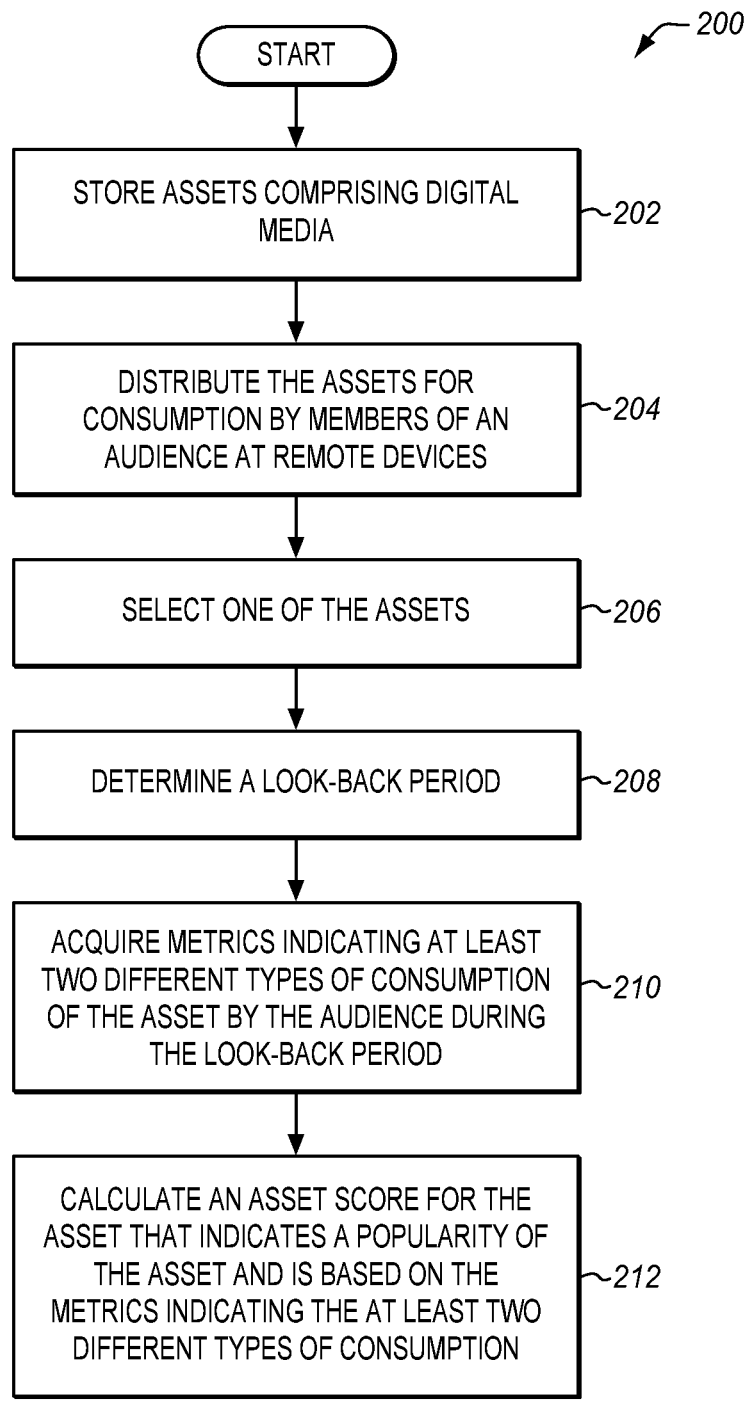
FIG. 2 is a flowchart illustrating a method of operating an asset scoring system in an illustrative embodiment.

FIG. 2 is a flowchart illustrating a method 200 for operating an asset scoring system in an illustrative embodiment. The steps of method 200 are described with reference to asset scoring system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, controller 114 stores the assets from the user in asset library 130. Each of the assets comprises one or more pieces of digital media (e.g., a video, an image, a sound file, a piece of text). Assets stored in asset library 130 may be accompanied by metadata indicating a score for the asset, a size of the asset, a resolution of the asset, a color space of the asset, etc.

Controller 114 receives input from the user at client device 170 indicating preferred techniques for distributing the assets. For example, the user input may indicate one or more third-party servers to receive copies of the assets. Based on this input, controller 114 distributes the assets for consumption by members of the audience (e.g., website users, social media users, cellular device users, etc.). The assets may be distributed directly, via third-party servers 152, and/or remote devices 180 in step 204. For example, an asset may be directly distributed to remote devices 180 of audience members by brand management server 110 (e.g., as part of a website hosted at brand management server 110). Alternatively, brand management server 110 may distribute an asset to a third-party server 152, which may then provide copies of the asset to remote devices 180 of audience members.

Brand management server 110 continues to distribute the assets over a period of time. Eventually, controller 114 determines that the time has come to score at least one of the assets being distributed. To this end, controller 114 selects one of the assets in step 206. The asset may be selected based on any criteria, such as in accordance with a predefined list, based on user input, etc. In one embodiment, all assets within a brand are selected for batch processing on a periodic basis (e.g., daily).

With an asset selected, controller 114 determines a look-back period in step 208. The look-back period may vary depending on the asset, or may be constant for all assets. In one embodiment, the look-back period comprises a predefined length of time that advances forward as a function of time (e.g., the last week, last day, last month, last hour, etc.).

In step 210, controller 114 acquires metrics indicating at least two different types of consumption of the asset by the audience during the look-back period. As used herein, a "type of consumption" refers to a process by which an audience member digitally interacts with an asset. Measurements of particular types of consumption include a count of views, a count of downloads, a count of shares, a count of clicks, a count of conversions or value of conversions, a count of likes, a count of searches, a count of comments, and/or a count of tags used by audience members in relation to the asset. In instances where brand management server 110 is directly distributing assets to members of the audience (e.g., via network 140), metrics may be directly determined and accumulated by controller 114 based on interactions between brand management server 110 and remote devices 180. In instances where an asset is hosted on a third-party server 152, such servers may notify brand management server 110 on a periodic basis as the third-party servers 152 acquire the metrics. In one embodiment, brand management server 110 operates a publish/subscribe ("pub/sub") server that receives updates from the third-party servers 152 via a backend data pipeline that has an event-ingest service. Events such as the consumption of an asset may be received at the pub/sub server from various sources, and these events may be pushed a publish-subscribe pipeline accessed by brand management server 110.

With the metrics acquired, in step 212 controller 114 calculates an asset score for the asset that indicates a popularity of the asset and is based on the metrics indicating the at least two different types of consumption. In one embodiment, controller 114 generates an asset score for each asset being actively distributed, by performing steps 210-212 at regular intervals for a large group of assets.

An asset score is calculated using asset scoring model 124, and the asset score may comprise a time-weighted combination of the metrics for each of the at least two different types of consumption. For example, each act of consumption of the asset during the look-back period may be assigned a value depending on the type of consumption, and the value contributed to an asset score by an act of consumption may progressively be degraded by a time decay function, based on a length of time ago that the act of consumption occurred.

In one embodiment, data received via a pipeline is aggregated on a daily basis and used by controller 114 to calculate asset scores. As a part of calculating asset scores, a "raw asset score" for each asset is computed. In this embodiment, the raw asset score is a time weighted combination of counts of each of the different types of consumption as per formula (1) below, wherein $RS_i$ is the raw score for an asset i, $w_k$ are the weights for each type of consumption k, g(t) is a time decay function (e.g., an exponential function, step function, linear function, etc.), and $C_i^k(t)$ is the count of a type of consumption k for asset i on day t:

$$RS_i \Sigma_t \Sigma_k w_k g(t) C_i^k(t) \quad (1)$$

Having computed raw asset scores, controller 114 may further normalize the asset scores within a range (e.g., between zero and one hundred). This may be performed by selecting a group of assets for normalization (e.g., assets within the same brand, a group of similar images, assets that are text, assets that are images, assets that are video, assets across an entire organization, etc.), and identifying an asset within the group having a highest raw asset score.

The asset with the highest raw score may be referred to as $\max(RS_1, \ldots, RS_n)$. Normalized asset scores may then be determined within a desired range from zero to a maximum value (e.g., one hundred) from each raw score $RS_i$ according to formula (2) below:

$$S_i = \frac{RS_i}{\max(RS_1, \ldots, RS_n)} \times (\text{Maximum Value}) \quad (2)$$

The weights $w_k$ assigned to each type of consumption, and the time decay function g(t), may be predefined or may be based on other factors. For example, weights for different types of consumption may be equal by default. In one embodiment, a user chooses weights for each type of consumption. For example, a user may define weights for different types of consumption using natural language descriptors (e.g., "very important," "unimportant," "mildly important," etc.). Each natural language descriptor for a weight may be associated with a different value (e.g., 0.9, 0.1, 0.4, etc.). In a similar fashion, the user may choose a type of decay function g(t) (e.g., none, exponential decay, step function, or gradual decay), and controller 114 may then implement a predefined decay function of the selected type. In further embodiments, the user may even specifically define the contents of a decay function.

With the normalized asset scores known, controller 114 provides the normalized asset scores to client device 170. Client device 170 may then present the user with a Graphical User Interface (GUI) depicting the normalized asset scores, and may arrange and color code the assets based on their scores.

Method 200 provides a substantial advantage over prior techniques, because it enables input from a variety of sources (indicating a variety of types of consumption of an asset), to be aggregated into a single value that is easily comparable against other assets and is easily interpretable by a human. This helps a brand manager to rapidly identify assets which are underperforming, and therefore addresses technical problems related to processing and presenting information in a manner that facilitates interpretation and understanding by users.

In further embodiments, weights initially chosen by a user may be fine-tuned by controller 114 based on a machine learning model (e.g., a neural network) stored in memory 116. The machine learning model may change the weights assigned to each different type of consumption based on feedback from the user over time. More specifically, once every period of time (e.g., once per week), controller 114 may query the user to determine whether the asset score for an asset or group of assets appears to be realistic to the user. The user may then provide a natural language descriptor of performance (e.g., "perfect," "totally-off," or "somewhat relevant"), or a numeric score. The machine learning model may then use this feedback as input in order to adjust the current combination of weights. Controller 114 may even use the feedback from the user to build a model correlating weights and relevancy as per formula (3) below:

$$\text{relevancy} = f(w_1, \ldots, w_n) \quad (3)$$

The model that correlates weights with relevancy may be implemented as a standard classification model (e.g., a logistic-regression model that correlates weights with the textual descriptors discussed above). Having determined a relationship between relevancy and weights, various combination of weights may be applied to the machine learning model until a combination of weights that maximizes relevancy has been determined (e.g., in order to solve an unconstrained optimization problem). The weights determined from this procedure may then be used to provide more relevant asset scores to the user. These relationships between relevancy and weights may vary on a user-by-user basis, and controller 114 may therefore determine different relationships for different users who manage different assets or brands.

With a discussion of asset score calculation provided above, further discussion focuses upon how asset scores may be tracked, predicted, and combined in order to provide greater insight to brand managers.

Asset Score Tracking and Prediction

Figure 3:
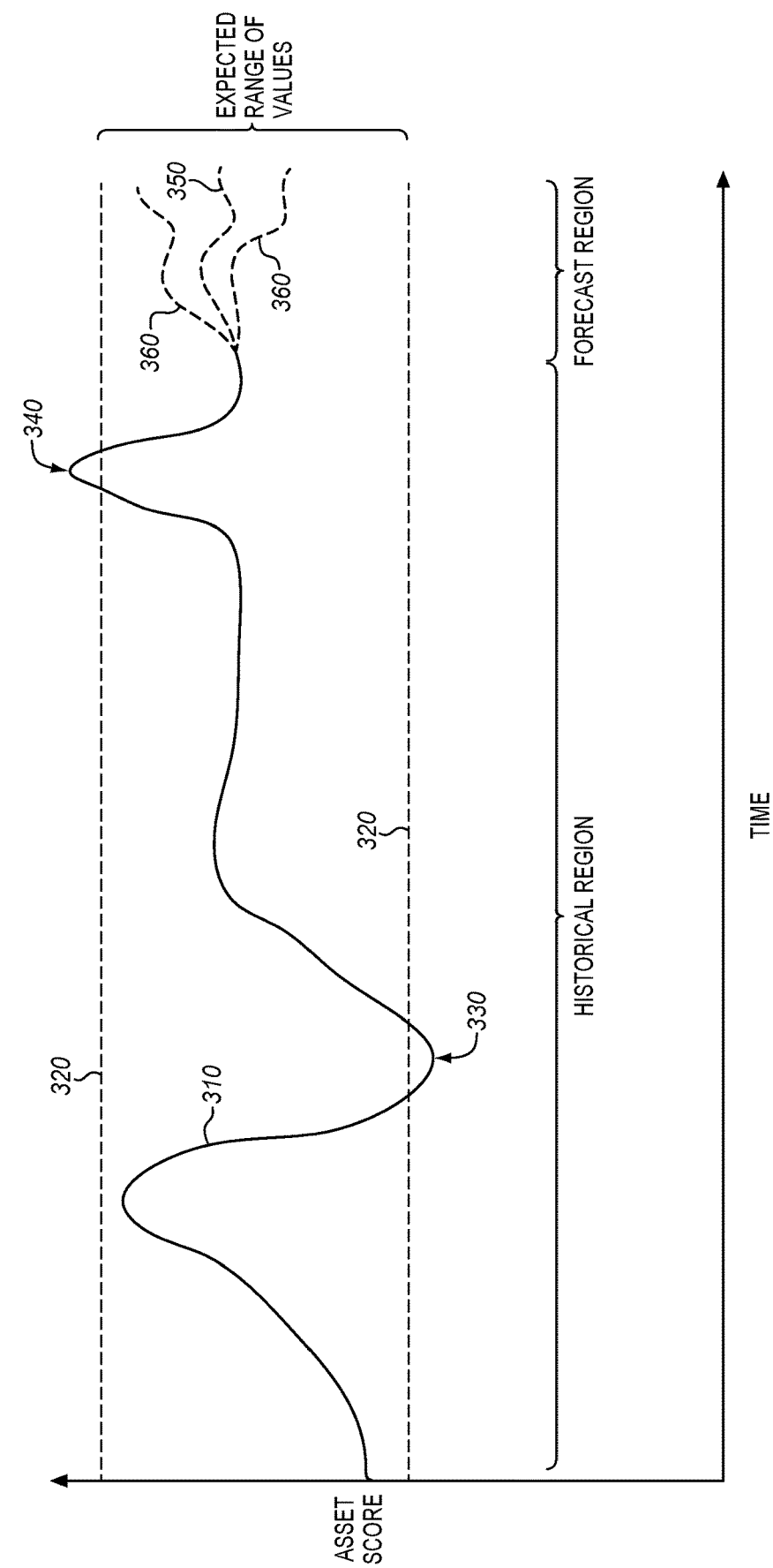
FIG. 3 is a graph illustrating historical and projected scores for an asset in an illustrative embodiment.

By calculating the asset scores discussed above on a periodic basis, the historical change in score for an asset may be tracked over a length of time (e.g., a week, a month, a year, etc.). FIG. 3 is a graph 300 illustrating asset scores over time in an illustrative embodiment. FIG. 3 includes historical scores 310 (i.e., a historical series of asset scores), which are located within a historical region and indicate previously calculated scores for an asset. Based on historical scores 310, controller 114 determines an expected range of values for asset scores, as indicated by boundaries 320. The expected range of values may comprise, for example, a range occupied by a large percentage (e.g., eighty percent, ninety five percent, ninety nine percent, two standard deviations, etc.) of prior scores for the asset. The prior scores may be considered across the entire history of the asset, or for a predefined period (e.g., one year). Using this technique, even though a dip 330 or a peak 340 outside of the expected range of values may exist within the historical scores 310, most scores will be located between boundaries 320. Graph 300 may be presented to a user of client device 170 in order to report how the asset has performed over time. In further embodiments, historical scores 310 for multiple assets may be presented on the same graph.

Historical scores 310 may also be used in order to identify unexpected changes in the popularity of an asset over time. As a part of this process, controller 114 may compare a recent asset score (e.g., the most recent asset score) to historical scores 310. In one embodiment, if an asset score leaves the expected range (an "asset score anomaly"), or increases or decreases at a rate faster than its historical average (an "asset acceleration anomaly") (e.g., twice as fast, ten times as fast), controller 114 may generate a notification to indicate this condition to a user at client device 170. Other types of asset anomaly may also be reported if an asset starts to behave in a markedly different manner than its normal baseline performance. For example, controller 114 may generate a report if the historical average score of the asset changes by more than a threshold amount (e.g., ten percent), if the score of the asset changes with more or less volatility than in the past, etc.

Graph 300 also includes a forecast region, wherein predicted scores 350 for the asset are included. A predicted score 350 may comprise an estimate of an asset score at a known time in the future, and may be based on historical fluctuations or changes in the score for an asset. The predicted scores 350 may be determined based on a linear regression of a series of historical asset scores, may be based on an analysis performed by a machine learning model (e.g., a trained deep neural network), etc. Predicted scores 350 are bounded by confidence limits 360, which indicate a range of estimated scores within a standard error or a predefined confidence interval (e.g., a ninety-five percent interval). Confidence limits 360 are likely to increase in span over time, as longer-range forecasts of scores are less likely to be accurate than shorter-term forecasts.

New Asset Score Prediction

When a user generates a new asset and uploads the new asset to brand management server 110, the user may desire to understand how the new asset will be received by its intended audience in comparison to other existing assets. To this end, controller 114 of brand management server 110 is capable of generating predicted scores for the new asset, in order to forecast how the audience will consume the new asset. This not only provides immediate feedback regarding the quality of a new asset, but also provides an opportunity for the user to revise a new asset and improve it, all before the audience has even viewed the new asset.

Figure 4:
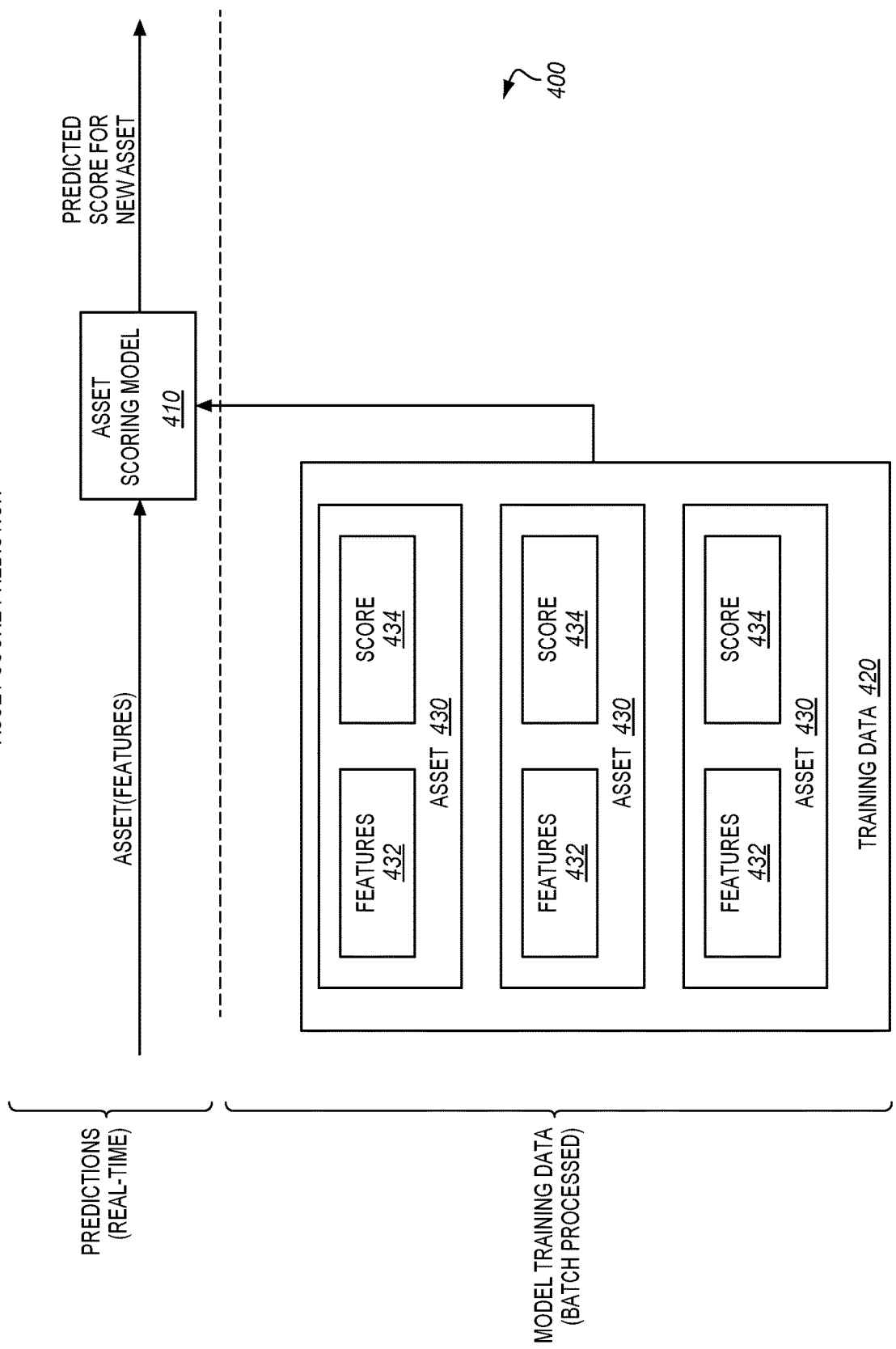
FIG. 4 is a block diagram illustrating score prediction for assets in an illustrative embodiment.

FIG. 4 is a block diagram 400 illustrating score prediction for assets in an illustrative embodiment. According to FIG. 4, asset scores are predicted for a new asset in real-time, based on an asset scoring model 410 which considers features found within the new asset, features found within existing assets, and scores for existing assets. The asset scoring model 410 may for example comprise a machine learning model, such as a neural network having layers with nodes that identify features found within the new asset, and also having layers that predict the contribution of each feature to the score of an asset. "Features" comprise any properties, content, or thematic similarities which may be shared between assets. Features may refer both to the file properties of an asset (e.g., resolution, file type, etc.) and to objects or concepts depicted within (or referenced by) the contents of an asset (e.g., a feature of "tree" may be found if there is a depiction of a tree within an image or video, a reference to a tree within text or audio, etc.). Features may therefore comprise file metadata, identifiable objects depicted within an image, a length of an audio or text file in time or words, shared textual content in a text file, extracted word embeddings of a text file, tags identified in an image file, convolution neural network encoding of an image (using transfer learning), an amount of saturation of an image, a primary hue of an image, etc.

As a preliminary matter when predicting the score of a new asset, controller 114 may select features to search for within new assets. The selected features may be predefined based on user input, or may be automatically determined. For example, L1/L2 regularization procedures like lasso or ridge regression procedures in a linear regression model may be used to select features that are relevant and to weed out features that are irrelevant. If a new asset shares selected features with other assets, then it may have a similar score to those other assets.

Asset scoring model 410 may attempt to automatically determine which features exist within the new asset For example, asset scoring model 410 may determine which features exist within an image, video, text file, or audio file based on a KAZE descriptor in the OpenCV library, such as that described in "KAZE Features" by Alcantarilla P. F., Bartoli A., Davison A. J. (2012), in: Fitzgibbon A., Lazebnik S., Perona P., Sato Y., Schmid C. (eds) Computer Vision—ECCV 2012. ECCV 2012, Lecture Notes in Computer Science, vol 7577, Springer, Berlin, Heidelberg. In a further embodiment, controller 114 may receive data indicating which features that are known to exist within the new asset.

In some embodiments, it may be unclear whether certain features actually exist within an asset. Features may therefore be associated with confidence values indicating their likelihood of existence within a specific asset, and asset scoring model 410 may adjust its predictive process based on these likelihoods.

With the number and type of shared features known, asset scoring model 410 predicts a score for the new asset. Asset scoring model 410 may utilize high fidelity models like neural network regression and random forest regression techniques to predict asset scores and may also use low fidelity techniques such as linear regression to identify a degree of contribution of each feature to an asset score. For example, feature correlation may be determined based on learned parameters in a linear regression model within asset scoring model 410.

Asset scoring model 410 may be trained beforehand to ensure a desired level of accuracy in predicting asset scores based on the selected features. Asset scoring model 410 may be updated periodically (e.g., daily, weekly, monthly) as the scores 434 of assets 430 in training data 420 change, in order to fine tune asset scoring model 410 and account for changes in audience taste or composition over time. Regardless of this fine-tuning process being performed on a periodic basis, controller 114 may predict scores for new assets via asset scoring model 410 in real time, based on currently trained parameters.

Figure 5:
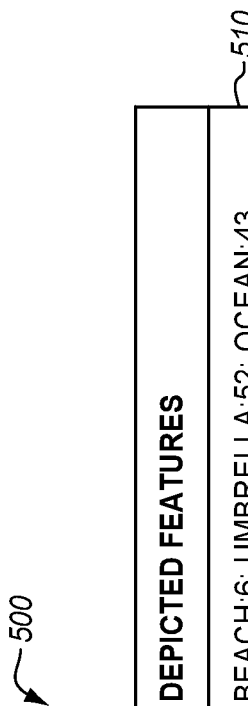
FIG. 5 is a table illustrating a list of assets in an illustrative embodiment.

FIG. 5 is a table 500 illustrating a list of assets in an illustrative embodiment. Table 500 illustrates how metadata for each image may be stored within asset library 130. According to FIG. 5, each entry 510 in table 500 identifies an asset by name, provides an asset score determined for the asset, indicates a size of the asset in memory, dimensions of the asset, and depicted features found within the asset. Depicted features are listed as semicolon separated name-value pairs, wherein a name-value pair such as "BEACH:6" indicates with a numerical confidence of six that a beach is depicted or represented within the asset. Each entry 510 may also indicate other types of metadata, such as an applied filter, a file type, Multipurpose Internet Mail Extensions (MIME) type, color palette, bit depth, rendering technique, background color, compression algorithm, aperture of camera used to create the image, contrast level of the image, primary hue of the image, lens information of the camera used to create the image, pixel information, saturation information, vibrance information, etc. Any and all of the properties discussed above may be treated as features if desired.

Figure 6:
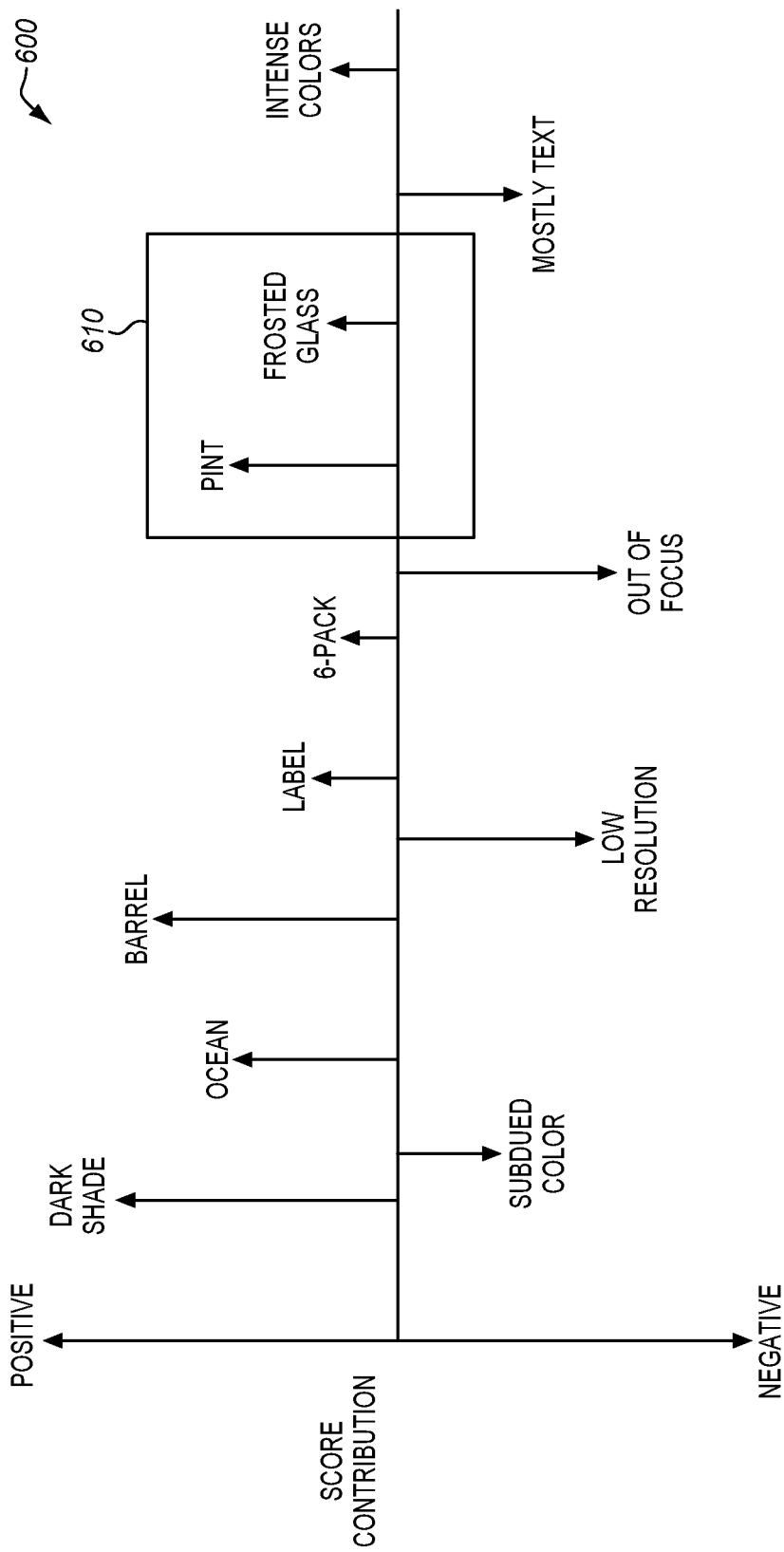
FIG. 6 is a chart illustrating the estimated influence of image features upon asset scores in an illustrative embodiment.

FIG. 6 is a chart 600 illustrating estimated score contributions of image features in an illustrative embodiment. For example, chart 600 may illustrate the value of weights for nodes within a neural network that are each associated with a feature. Chart 600 illustrates that some features may contribute positively to the score of an asset, while other features may contribute negatively. Chart 600 may also be provided to a user of client device 170 via a GUI, in order to suggest features to include in (or remove from) newly created assets.

FIG. 6 also illustrates that features which are often found together in assets may be grouped together, such as shown in group 610. The average influence of features within a group may be reported in order to provide further insights. For example, a group of features that depict a beach may include features for sand, ocean, sun, and palm trees. The average score contribution of each feature in the group may then be reported to a user designing a new asset.

Assets themselves may also be grouped, using a clustering procedure such as K-Means. Respective scores of grouped assets may then be compared in order to provide context for the user. For example, users may be presented with assets that share similar underlying features and which behave in a similar manner (e.g., with regard to score contribution over time). This may help a user to determine which differences (if any) are responsible for different scores between assets that share a large number of features.

Figure 7:
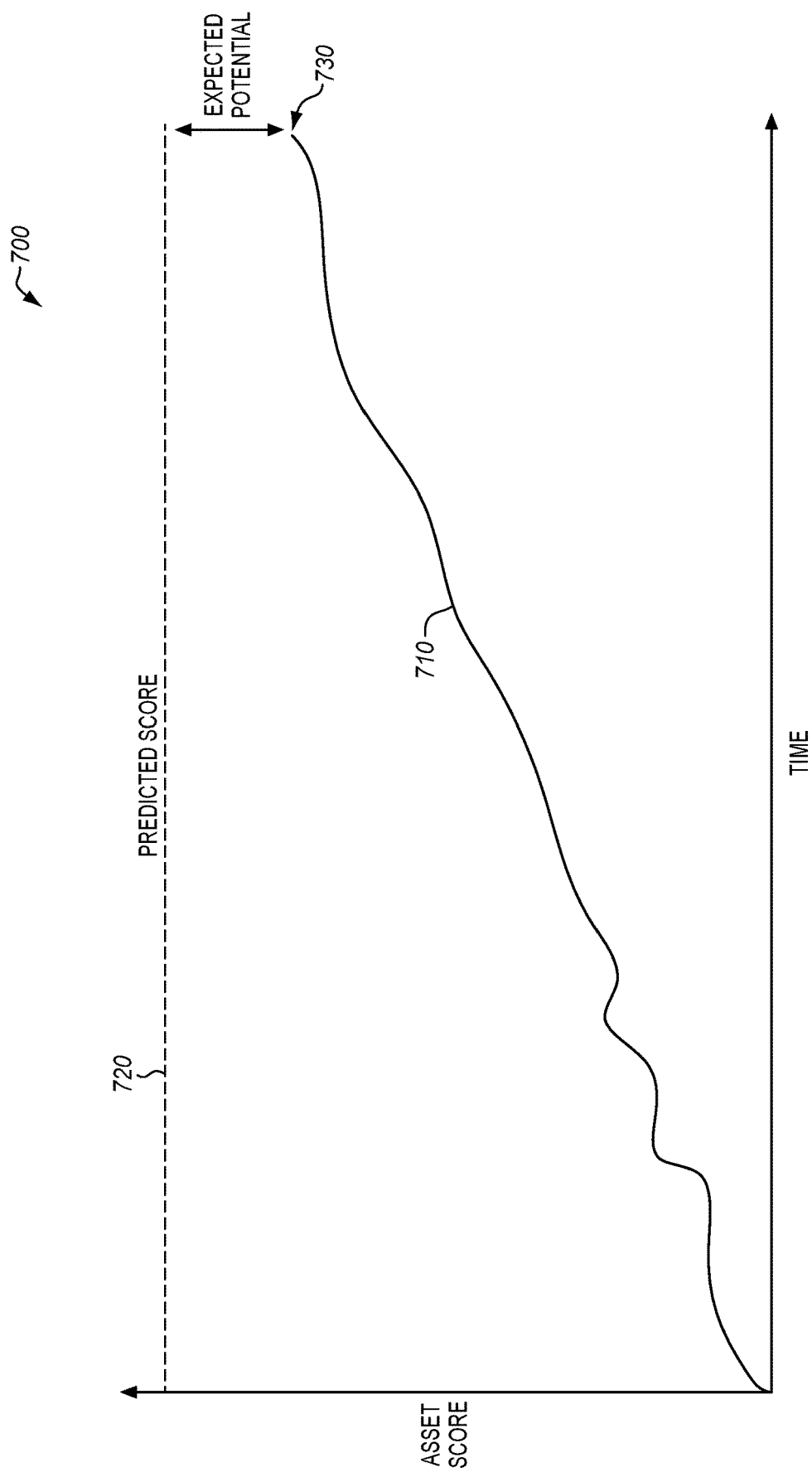
FIG. 7 is a graph illustrating progress of an asset towards a predicted score in an illustrative embodiment.

With the predicted score of a new asset known, controller 114 may present information indicating the progress of the new asset towards its predicted score. For example, FIG. 7 is a graph 700 illustrating progress of an asset towards a predicted score 720 in an illustrative embodiment. Graph 700, or a similar visual aid, may be presented by controller 114 to a user of client device 170 via a GUI. Graph 700 presents historical scores 710 for a new asset since a point in time (e.g., since the new asset was first distributed), and includes a predicted score 720 indicating a predicted asset score for the new asset after the new asset has been in distribution for at least a threshold amount of time (e.g., a month, a week, any time long enough to fully mature, etc.). Controller 114 may report the difference between the current score and the predicted score 720 of the asset, and may also forecast a date at which the new asset will reach its predicted score, using a linear regression or other forecasting technique based on historical scores for the new asset. In further embodiments, controller 114 may modify an originally predicted score or originally forecasted score using a Bayesian updating procedure (utilizing the new stream of data after that original prediction date). Adjusting these factors provides a better estimate of the remaining potential of an asset.

Brand Scoring and Prediction

While the above FIGS. and description focus upon determining and tracking scores for individual assets, the following FIGS. illustrate scoring and tracking performed upon entire groups of assets (e.g., all assets within a brand) in order to arrive at an aggregate score for the group. Aggregate scores may help a user to determine the popularity of one brand with respect to other brands, which in turn helps the user to gauge market capture by different brands having a similar audience. These aggregate scores for groups of assets are also referred to herein as "brand scores."

Figure 8:
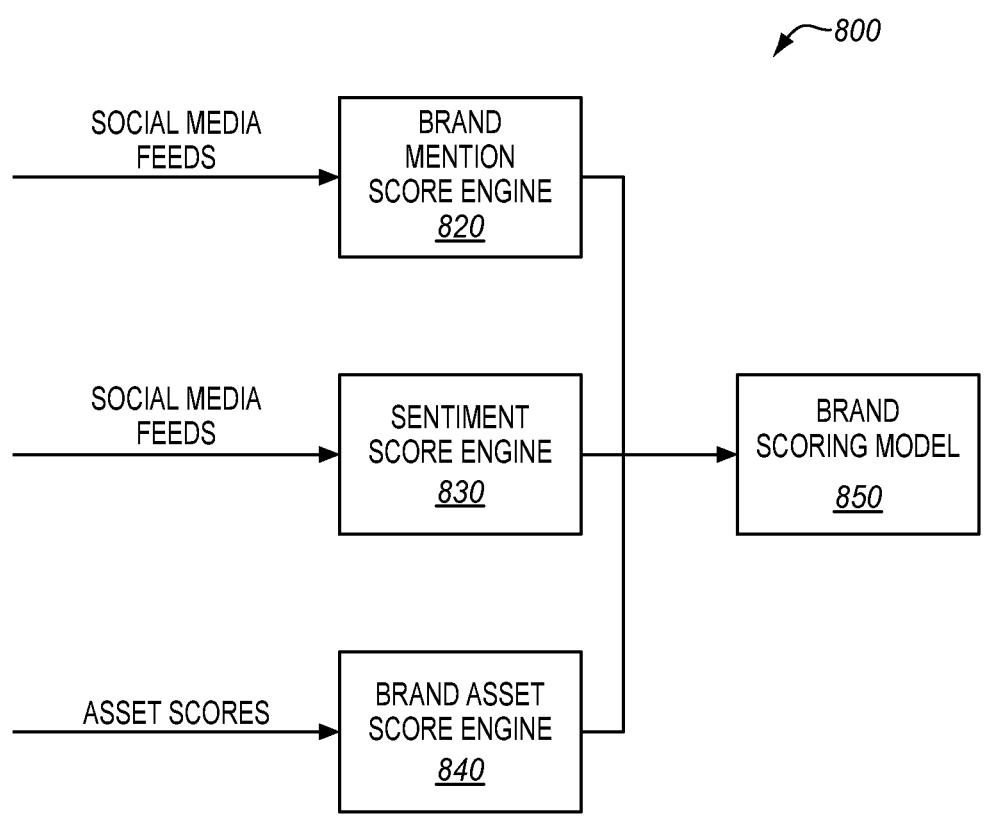
FIG. 8 is a block diagram illustrating inputs for brand score calculation in an illustrative embodiment.

FIG. 8 is a block diagram 800 illustrating inputs for brand score calculation in an illustrative embodiment. In this embodiment, inputs for brand score calculation include social media feeds, asset scores calculated as described above, inputs from an Application Programming Interface (API) for brand management server 110, inputs from a CDN API, an advertiser (e.g., DoubleClick) API, other social media API, employee review data pertaining to the brand, etc. These inputs are processed and used by controller 114 when implementing brand scoring model 850 (stored within memory 116) in order to arrive at a brand score. For example, in the embodiment shown in FIG. 8, brand mention score engine 820 may parse social media feeds (e.g., Facebook posts, twitter posts, etc.) to detect a number of mentions of the brand (and/or assets for the brand) in order to create a social media activity score.

Sentiment score engine 830 may perform natural language analysis upon social media feeds in order to determine whether mentions of a brand (and/or assets for the brand) are positive or negative. This may include determining whether the brand is associated with words having a positive or negative connotation with respect to the brand. For example, words associated with a raw or edgy tone may be considered positive for an energy drinks brand, but may be considered negative for a brand of medications. The tone of various word combinations may be predefined by the user, or may be determined by a trained machine learning model over time. Individual sentiment determinations for an asset or brand may then be aggregated in order to arrive at a sentiment score. Each type of score may also be normalized with similar types of scores for brands in the same vertical.

Brand asset score engine 840 reviews asset scores (e.g., raw asset scores) for a group of assets, for example by picking the highest raw score within the group of assets or by summing these scores. The various scoring engines discussed herein may be stored in memory 116 of brand management server 110.

With the inputs received, controller 114 may operate brand scoring model 850 in order to combine sentiment scores, mention scores, and/or asset scores into a raw brand score. Brand scoring model 850 may comprise a predefined formula, or a machine learning model such as a neural network that has been trained. A raw brand score may be normalized with regard to other brands in the same field ("vertical") or other brands that are marketed to the same demographic. These normalized brand scores (and/or brand rankings) may then be presented to a user of client device 170 in order to indicate a brand's position in relationship to other brands in its vertical (e.g., make-up, pharmaceuticals, alcoholic beverages, sporting goods, etc.). This not only illustrates the competitiveness of a brand with regard to other brands, but also indicates whether a brand still has the potential for growth relative to its competitors.

In one embodiment, the process of brand scoring is performed in the following manner. Brand asset score engine 840 determines Raw Brand Scores (RBFs) for each brand i within a predefined vertical. $RBF_i$ may be defined as the maximum value across all raw scores of assets in the brand i according to formula (4) below:

$$RBF_i = \max(RS_1^i, \ldots, RS_n^i) \quad (4)$$

$RBF_i$ may alternatively be calculated as a summation of raw scores of assets within a brand or other group of assets. In either case, $RBF_i$ does not yet include brand mention scores or sentiment scores at this juncture.

$RBF_i$ may be normalized with other brands belonging to the same vertical (e.g., apparel, sports, finance) according to formula (5) below, wherein $BF_i$ is a normalized asset-based score for a brand, $V_i$ is the vertical that brand i belongs, m is the total number of brands in the vertical, and Maximum Value is the maximum desired normalized value for any normalized asset-based score for a brand:

$$BF_i = (\text{Maximum Value}) \times RBF_i / \max(RBF_n, \ldots, RBF_m) \text{ for all} \{n, \ldots, m\} \in V_i \quad (5)$$

A finalized brand score may then be determined by combining a normalized asset-based brand score with metrics from other sources (e.g., a social media mention score, a social media sentiment score, etc.). The final brand score for each brand is computed as a weighted average of the various scores, including the normalized asset-based brand score, according to formula (6) below, wherein $w_j$ is the weight assigned to each type of score (e.g., asset-based brand score, sentiment score etc.), g(t) is a time decay function, and $BS_{ij}$ is the score for the $i^{th}$ brand for the $j^{th}$ type of score:

$$B_i = \Sigma_i \Sigma_j g(t) w_j BS_{ij} \quad (6)$$

Weights $w_j$ used for the combination of different types of scores may be determined as a function of user preference on a user-by-user basis, in a similar manner as weights for asset scores were determined above. This means that brand scores calculated for each brand may vary based on the subjective preferences of each user (i.e., because users with different preferences may weight different types of scores differently)

Current and previous trends related to a brand (e.g., stock prices for a company that owns a brand, revenue for that company, etc.) may also impact the weights $w_j$ for a type of score j, and the degree of such impacts may again be tailored based on user preferences. Users may even provide additional scoring and metrics as desired to influence the score of a brand, and may track individual $BS_{ij}$ values for different types of score j for a brand i in order to receive immediate feedback indicating which asset campaigns have the most impact on social media, the greatest degree of consumption by audience members, etc.

Types of Metrics Considered for Brand Scores

Metrics for a brand may include an almost limitless variety of inputs. For example, metrics may report a number of products related to the brand, a number of employees at the company that owns the brand, a number of employees that perform management of the brand, a number of locations, cities, countries, and/or languages that the brand is marketed in, a number of trademarks, patents, and/or copyrights associated with the brand, a number of publications describing the brand, a number of lawsuits pending, won, or lost relating to the brand, a stock price of a company owning the brand, a number and/or popularity of press releases regarding the brand, demographics of audience members (reach), a number of years that the brand or the company operating the brand has been in business, whether a brand is business-to-business or business-to-consumer (which may influence how other metrics are weighted), etc.

Metrics may also indicate online presence related to a brand. For example, metrics for social media presence may report a number of social media accounts owned by the brand, a number of followers for the brand on each of multiple social media platforms, an amount of retweets or reposts of brand names or assets, a sentiment score for posts that have been referred to by audience members, etc. Metrics of online activity may report an ad conversion rate, recurrence of search terms related to the brand in Google search trends (and associated sentiment), website usage (e.g., a number of monthly active users at a website for the brand), online sales and revenue, a number of customer emails registered to receive updates for the brand, a number of registered users at a website for the brand), a Search Engine Optimization (SEO) rating, and/or a score for security at a website for the brand.

Further metrics may indicate how actively the brand updates and manages its presence via assets. Such metrics may report a number of assets for a brand, sizes and/or resolutions for the assets, an average age of the assets, a rate of change in assets over time ("freshness"), etc.

Metrics may also report the reputation of a brand separately from the popularity of the brand. These metrics may indicate a reputation or number of years of experience of executives for the brand, and/or a reputation of affiliates for the brand. These metrics may even indicate an overall "ethical" representation of a brand, by providing reports about work environment, brand environmentalism, community involvement or charity acts performed in relation to the brand, donations made by owners of the brand, and a level of transparency of the brand. Brand reputation may also be indicated by metrics reporting open source contributions related to a brand, or a reputation or number of questions answered on StackOverflow relating to the brand.

Customer loyalty and attachment to a brand may also be reported via metrics. such metrics may report a rate of recurring customers as compared to new customers, whether or not a brand has a credit card or reward program (and if so, a measurement of use of such credit cards or rewards programs), etc. Metrics in the form of surveys provided to audience members may also indicate customer loyalty and attachment. Such surveys may ask whether an audience member has purchased a product associated with the brand, a likelihood of the audience member purchasing another product associated with the brand, a likelihood of providing referrals, an amount of trust that the audience member has in the brand, whether or not customer service experiences related to the brand have been positive, and more.

Existing Brand Score Tracking and Prediction

Figure 9:
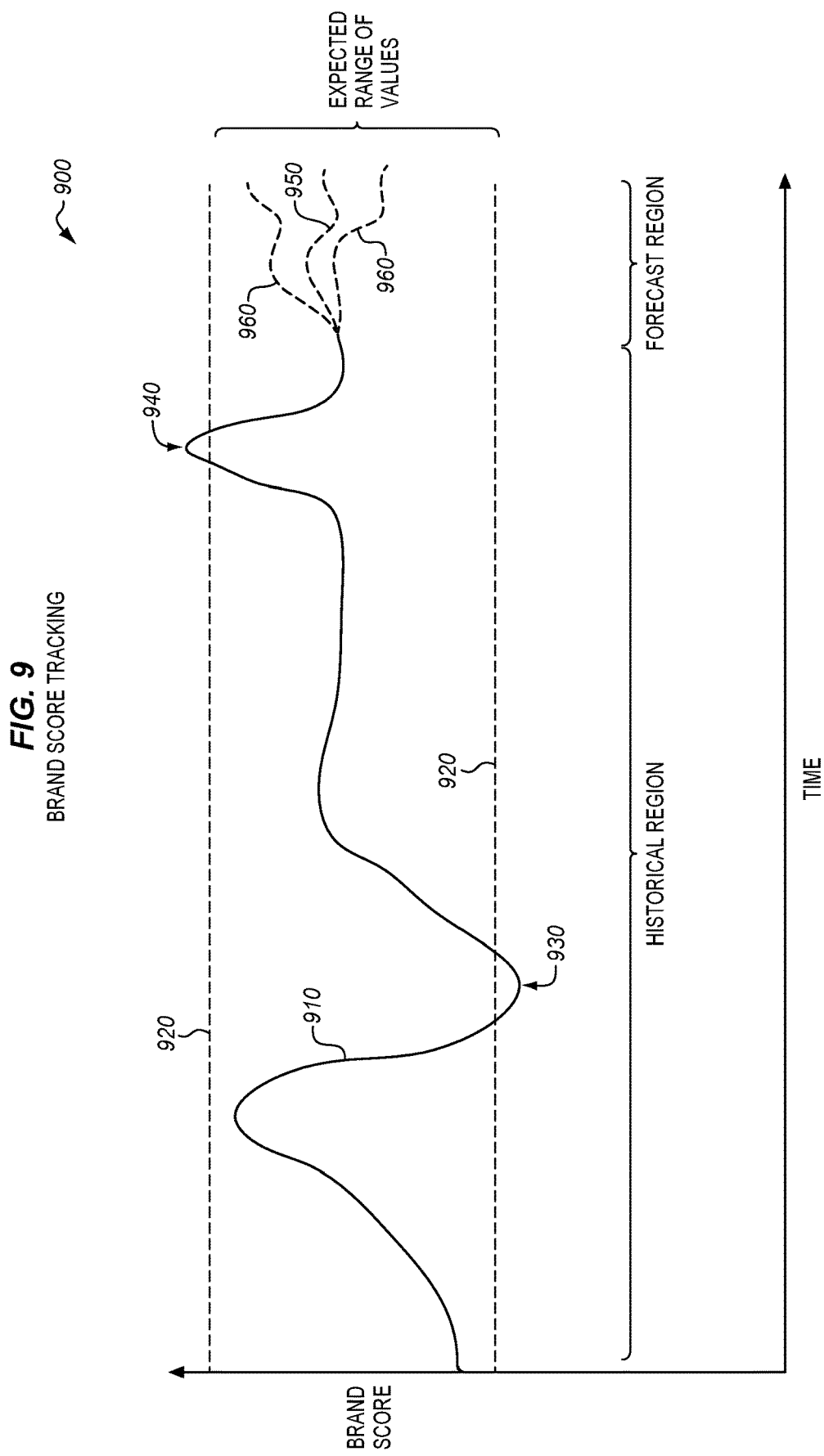
FIG. 9 is a graph illustrating historical and projected scores for brands in an illustrative embodiment.

Utilizing the brand score calculation techniques discussed above, the historical change in score for a brand may be tracked, and predicted brand scores may be forecasted based on historical scores for a brand over a length of time (e.g., a week, a month, a year, etc.) in a similar manner as described for assets in FIG. 3 above. For example, FIG. 9 is a graph 900 illustrating historical and projected brand scores in an illustrative embodiment. FIG. 9 includes historical brand scores 910, boundaries 920, a dip 930, a peak 940, predicted brand scores 950, and confidence limits 960 for predicted brand scores 950. Anomalies for a brand may also be detected and reported in a similar manner as anomalies for an asset, based on changes in brand score over time.

With historical scores known for a brand or asset, future scores may be forecasted using any suitable time series techniques, such as AutoRegressive-Moving-Average (ARMA) models. Forecasts may also be computed as a function of not only time but also various external regression parameters such as reports of economic outlook for a company that owns a brand, stock prices for the company, etc. Such forecasts may be modeled using time-series regression extension models such as Autoregressive Integrated Moving Average with Explanatory Variable (ARIMAX) Model. This information may help a brand manager to quickly and accurately predict the future performance of the brand over time.

The success of a brand may also be evaluated by generating an index indicating an average of the brand's score over all days in a period of time (e.g., week, month, quarter, year, etc.). Such an index may be determined according to formula (7) below, wherein $BFIndex_i$ indicates the index value of a given brand i, j is equal to the selected period of time (e.g., a specific month, week, etc.), $ndays_j$ equals the number of days in the period, k is an iterating value indicating a specific day, and $B_i^k$ indicates a brand score (e.g., raw or normalized) of a brand i on a given day k:

$$BFIndex_i(month = j) = \frac{1}{ndays_j} \sum_k B_i^k$$

The index values discussed above may also be normalized with other brands, for example, by grouping and normalizing brands that are within the same vertical.

Figure 10:
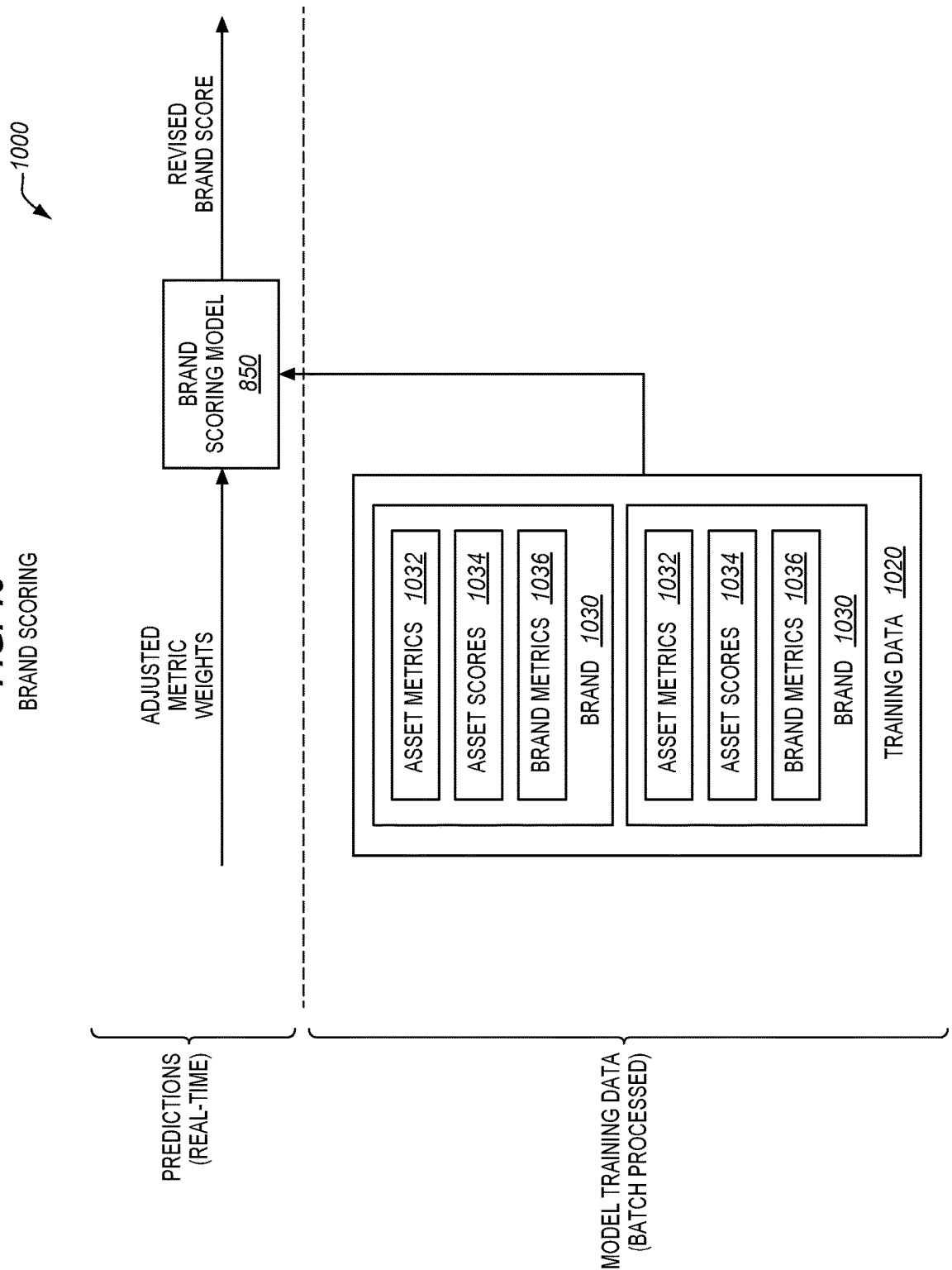
FIG. 10 is a block diagram illustrating brand score calculation in an illustrative embodiment.

FIG. 10 is a block diagram illustrating brand score prediction in an illustrative embodiment. Brand score predictions (e.g., for newly created brands) may be performed in a similar manner to asset score predictions. For example, brand scoring model 850 may predict or otherwise calculate brand scores in real-time, based on asset metrics 1032, asset scores 1034, and brand metrics 1036 for one or more brands 1030 indicated in training data 1020. Weights within brand scoring model 850 may also be periodically updated based on training data 1020.

The calculations of asset scores and brand scores described herein (and predictions relating thereto) may utilize a great deal of normalization, which may be processing intensive and may also rely on data which is only periodically updated. In order to provide real-time asset scores or brand scores, a machine learning serving model such as brand scoring model 850 or asset scoring model 410 may be pretrained to provide best estimates of changes to scores in real-time.

As a part of the pretraining process, when asset scores or brand scores are computed for each day in a batch process (e.g., a massively parallel compute process), they are computed for various combinations of weights which are determined by a sampling algorithm such as a latin hypercube sampling procedure. The resulting asset scores calculated for various weights are then used to build a machine learning regression model, such as a deep neural network. The model may be pretrained to understand relationships between asset scores and weights, based on algorithms such as polynomial regression. This means that when a user changes the combination of weights used to score an asset or brand, or when a user asks for a different weight combination, the pretrained model is capable of approximating scores for the assets at the new weights, without having to re-normalize all asset scores and/or brand scores. Meanwhile, controller 114 may also trigger a background process that precisely computes new scores, and replaces the approximated scores at a later time (e.g., after batch processing has completed at the end of a day and re-normalized asset and/or brand scores have been determined).

EXAMPLES

In the following examples, additional processes, systems, and methods are described in the context of a brand management server that actively tracks and reports asset scores and brand scores.

In this example, a user at client device 170 has established a new account for a beer brand at brand management server 110. The user uploads multiple assets in the form of images to memory 116 of brand management server 110, and instructs brand management server 110 to host the assets for distribution in a brewery website, and also to distribute the assets to a third-party server 152 for use in a social network campaign. Over a period of days, the assets are distributed and consumed by an audience. During this time, brand management server 110 acquires data from third-party server 152 via a publish/subscribe server. The data indicates consumption of the assets in the social network. Brand management server 110 also accumulates data indicating consumption of the assets by audience members (e.g., potential customers) visiting the brewery website. In this example, the types of consumption of an asset include a count of views of the asset and a count of clicks on the asset.

After a week has passed, the user logs in to brand management server 110 and requests that each asset in the brand be scored. Controller 114 proceeds to calculate an asset score for each asset, by performing a weighted combination of clicks and views over the last week. Clicks are weighted ten times more heavily than views, and the amount contributed to asset score by a click or view degrades in a linear fashion over a period of seven days. Using this model, controller 114 generates a raw score for each asset. Controller 114 then identifies the asset having the highest score, and normalizes all asset scores to a range between zero and ten based on the highest score. Assets are then sorted based on score from highest to lowest, and are presented to the user for review. The user realizes that one of the assets has a score of only one, in comparison with other that range in score from five to ten. The user then discontinues the underperforming asset.

In order to replace the underperforming asset, the user generates a new asset comprising a new image. The user then queries the controller 114 to predict a score of the new asset. Controller 114 operates asset scoring model 410 in order to predict the score. Asset scoring model 410 indicates that assets which are high resolution, have a high degree of saturation, and depict six-packs of beer are correlated with higher scores. Meanwhile, asset scoring model 410 indicates that assets which are dark and have substantial amounts of text are correlated with lower scores. Using this information, controller 114 determines that the new asset is likely to have an asset score of three point eight. The user determines that the asset includes a large amount of text, removes the text, and re-submits the new asset. Controller 114 then arrives at a predicted score of eight point one. The user then submits the new asset for distribution.

While the new asset is being distributed, controller 114 determines a difference between the current score and the predicted score of the asset, and reports this information to the user. The user tracks the score of the asset over a period of ten days, at which time the asset has achieved its predicted score of eight point one.

The user also requests that brand management server 110 provide a score for the beer brand as a whole, compared to other brands that market alcoholic beverages. Controller 114 therefore proceeds to review metrics for the brand to calculate a raw brand mention score, raw brand sentiment score, and raw brand score. Controller 114 normalizes the raw scores based on raw scores for other brands that market alcoholic beverages, and performs a weighted combination of the normalized scores for the beer brand to arrive at a normalized brand score. Controller 114 reports a normalized brand score of five point eight out of ten for the beer brand. The user then proceeds to use this information to inform the creation of further assets and the budget used for advertising campaigns.

Controller 114 also publishes the brand score for presentation to audience members, if the user has approved this action. Publicly available rankings brands based on goodness, effectiveness, work environments, etc. may help to further increase a brand's popularity with its audience.

Any of the various computing and/or control elements shown in the figures or described herein may be implemented as hardware, as a processor implementing software or firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Figure 11:
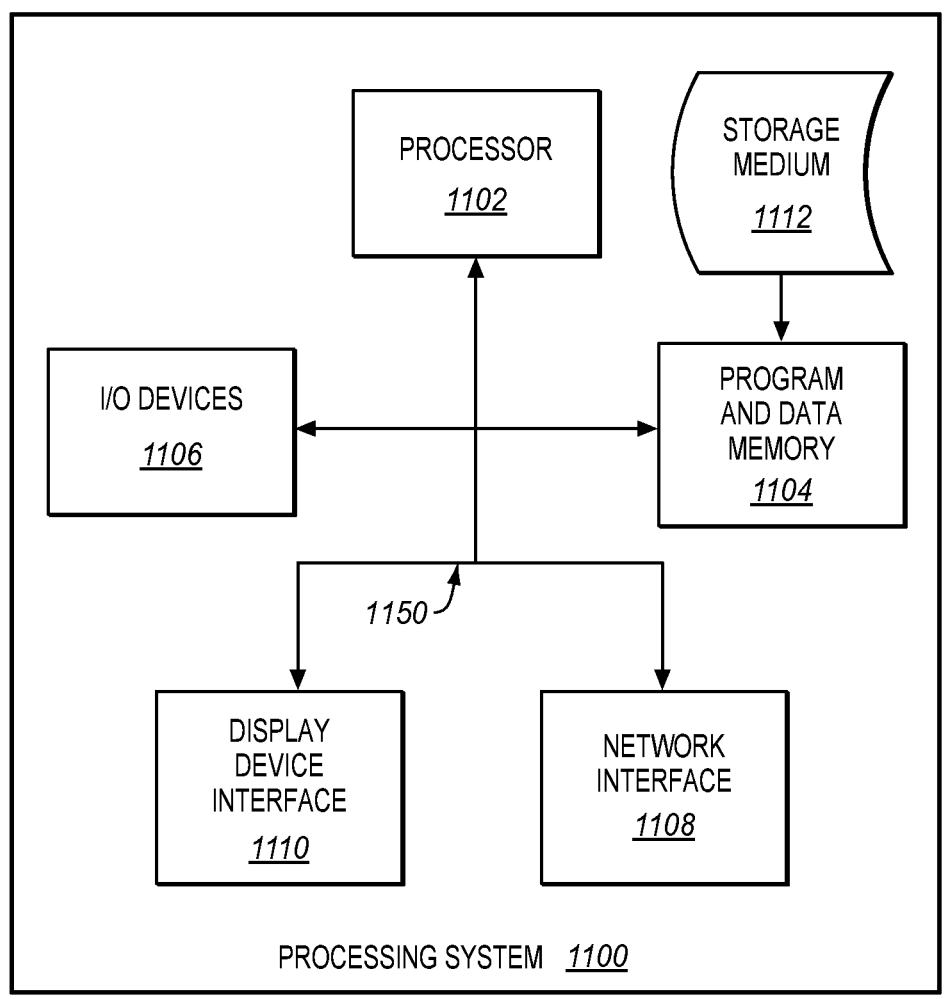
FIG. 11 depicts an illustrative computing system operable to execute programmed instructions embodied on a computer readable medium.

In one particular embodiment, instructions stored on a computer readable medium direct a computing system of brand management server 110, to perform the various operations disclosed herein. FIG. 11 depicts an illustrative computing system 1100 operable to execute a computer readable medium embodying programmed instructions. Computing system 1100 is operable to perform the above operations by executing programmed instructions tangibly embodied on computer readable storage medium 1112. In this regard, embodiments may utilize instructions (e.g., code) accessible via computer-readable medium 1112 for use by computing system 1100 or any other instruction execution system. For the purposes of this description, computer readable medium 1112 comprises any physical media that is capable of storing a program for use by computing system 1100. For example, computer-readable medium 1112 may be an electronic, magnetic, optical, electromagnetic, infrared, semiconductor device, or other non-transitory medium. Examples of computer-readable medium 1112 include a solid state memory, a magnetic tape, a removable computer diskette, a random access memory (RAM), a read-only memory (ROM), a rigid magnetic disk, and an optical disk. Current examples of optical disks include Compact Disk-Read Only Memory (CD-ROM), Compact Disk-Read/Write (CD-R/W), Digital Video Disc (DVD), and Blu-Ray Disc.

Computing system 1100, which stores and/or executes the instructions, includes at least one processor 1102 coupled to program and data memory 1104 through a system bus 1150. Program and data memory 1104 include local memory employed during actual execution of the program code, bulk storage, and/or cache memories that provide temporary storage of at least some program code and/or data in order to reduce the number of times the code and/or data are retrieved from bulk storage (e.g., a spinning disk hard drive) during execution.

Input/output or I/O devices 1106 (including but not limited to keyboards, displays, touchscreens, microphones, pointing devices, etc.) may be coupled either directly or through intervening I/O controllers. Network adapter interfaces 1108 may also be integrated with the system to enable computing system 1100 to become coupled to other computing systems or storage devices through intervening private or public networks. Network adapter interfaces 1108 may be implemented as modems, cable modems, Small Computer System Interface (SCSI) devices, Fibre Channel devices, Ethernet cards, wireless adapters, etc. Display device interface 1110 may be integrated with the system to interface to one or more display devices, such as screens for presentation of data generated by processor 1102.

What is claimed is:

1. A system comprising:
a brand management server comprising:
a memory that stores images; and
a controller that distributes the images via an interface coupled for communication with a network for consumption by members of an audience at remote devices,
for each of the images, the controller automatically determines a look-back period, acquires metrics indicating at least two different types of consumption of the image by the audience during the look-back period, and calculates an asset score for the image that indicates a popularity of the image and is based on the metrics indicating the at least two different types of consumption, wherein the asset score comprises a weighted combination of the metrics of the at least two different types of consumption, and each of the metrics has its own weight,
wherein asset scores for images in different brands are calculated concurrently in real-time using different weighted combinations of the metrics,
the controller presents asset scores via a Graphical User Interface (GUI) for review by a user, wherein the controller arranges and color codes the GUI based on the asset scores, and
the controller stores the asset scores in the memory as metadata for the images.

2. The system of claim 1 wherein:
the controller determines an expected range of asset scores for the image based on historical asset scores for the image, wherein the expected range comprises a range occupied by more than half of prior asset scores for the image during a predefined period, and the controller determines that a current asset score for the image is not within the expected range, and generates a notification in response to determining that the current asset score is not within the expected range.

3. The system of claim 1 wherein:

the at least two different types of consumption are selected from the group consisting of: views, downloads, shares, clicks, conversion, likes, searches, comments, and tags used by audience members in relation to the image; and the metrics are selected from the group consisting of: a count of views during the look-back period, a count of downloads during the look-back period, a count of shares during the look-back period, a count of clicks during the look-back period, a count of conversions during the look-back period, a value of conversions during the look-back period, a count of likes during the look-back period, and a count of searches during the look-back period.

4. The system of claim 1 wherein:

the images are stored in a library that indicates depicted features for each image, and the features are selected from the group consisting of: a size of the image in memory, dimensions of the image, and depicted features found within the image, an applied filter, a file type, Multipurpose Internet Mail Extensions (MIME) type, color palette, bit depth, rendering technique, background color, compression algorithm, aperture of a camera used to create the image, contrast level of the image, primary hue of the image, lens information of a camera used to create the image, pixel information, saturation information, and vibrance information, and the controller generates a chart indicating estimated contributions of features to asset scores.

5. The system of claim 1 wherein:

the controller identifies groups of images that are within the same brand, and normalizes asset scores within each of the groups to be within a desired range of values between zero and a maximum value, by, for each group: selecting the image in the group having a highest asset score, and for each image in the group, multiplying the asset score by the maximum value and dividing by the highest asset score.

6. The system of claim 1 wherein:

the controller calculates a historical series of asset scores for the image over time, forecasts asset scores for the image in the future based on the historical series of asset scores, determines confidence limits which indicate a range of estimated asset scores within a predefined confidence interval, and presents the range of estimated asset scores and confidence limits within a chart displayed at the GUI, wherein the confidence limits each depict a predefined confidence interval from an estimated asset score at a point in the future, and the chart increases a span of the confidence limits as a range of the forecast increases.

7. The system of claim 1 wherein:

the controller operates a machine learning model to predict asset scores for images, the machine learning model comprising a neural network having layers with nodes that identify features found within images, and also having layers that predict the contribution of each feature to the asset score of an image.

8. The system of claim 1 wherein:

the controller receives a new an image, identifies at least one feature depicted within the new image that is also depicted in other images having known asset scores, and predicts an asset score for the new image based on the at least one feature that is also depicted in other images and further based on a regression model that identifies a degree of contribution of the at least one feature to asset scores.

9. A method comprising:

storing images in a memory;

distributing the images via an interface coupled for communication with a network for consumption by members of an audience at remote devices;

for each of the images:

determining a look-back period;

acquiring metrics indicating at least two different types of consumption of the image by the audience during the look-back period; and calculating an asset score for the image that indicates a popularity of the image and is based on the metrics indicating the at least two different types of consumption, wherein the asset score comprises a weighted combination of the metrics of the at least two different types of consumption, and each of the metrics has its own weight, and wherein asset scores for images in different brands are calculated concurrently in real-time using different weighted combinations of the metrics;

presenting asset scores via a Graphical User Interface (GUI) for review by a user, wherein the GUI is arranged and color coded based on the asset scores; and storing the asset scores in the memory as metadata for the images.

10. The method of claim 9 further comprising:

determining an expected range of asset scores for the image based on historical asset scores for the image, wherein the expected range comprises a range occupied by more than half of prior asset scores for the image during a predefined period;

determining that a current asset score for the image is not within the expected range; and generating a notification in response to determining that the current asset score is not within the expected range.

11. The method of claim 9 wherein:

the at least two different types of consumption are selected from the group consisting of: views, downloads, shares, clicks, conversion, likes, searches, comments, and tags used by audience members in relation to the image, and the metrics are selected from the group consisting of: a count of views during the look-back period, a count of downloads during the look-back period, a count of shares during the look-back period, a count of clicks during the look-back period, a count of conversions during the look-back period, a value of conversions during the look-back period, a count of likes during the look-back period, and a count of searches during the look-back period.

12. The method of claim 9 wherein:

the images are stored in a library that indicates depicted features for each image, and the features are selected from the group consisting of: a size of the image in memory, dimensions of the image, and depicted features found within the image, an applied filter, a file type, Multipurpose Internet Mail Extensions (MIME) type, color palette, bit depth, rendering technique, background color, compression algorithm, aperture of a camera used to create the image, contrast level of the image, primary hue of the image, lens information of a camera used to create the image, pixel information, saturation information, and vibrance information, and the method further comprises generating a chart indicating estimated contributions of features to asset scores.

13. The method of claim 9 further comprising:
identifying groups of images that are within the same brand; and
normalizing asset scores within each of the groups to be within a desired range of values between zero and a maximum value, by, for each group: selecting the image in the group having a highest asset score, and for each image in the group, multiplying the asset score by the maximum value and dividing by the highest asset score.

14. The method of claim 9 further comprising:
calculating a historical series of asset scores for the image over time;
forecasting asset scores for the image in the future based on the historical series of asset scores;
determining confidence limits which indicate a range of estimated asset scores within a predefined confidence interval;
presenting the range of estimated asset scores and confidence limits within a chart displayed at the GUI, wherein the confidence limits each depict a predefined confidence interval from an estimated asset score at a point in the future, and the chart increases a span of the confidence limits as a range of the forecast increases; and
increasing a span of the confidence limits as a range of the forecast increases.

15. The method of claim 9 further comprising:
operating a machine learning model to predict asset scores for images, the machine learning model comprising a neural network having layers with nodes that identify features found within images, and also having layers that predict the contribution of each feature to the score of an image.

16. The method of claim 9 further comprising:
receiving a new image;
identifying at least one feature depicted within the new image that is also depicted in other assets having known asset scores; and
predicting an asset score for the new image based on the at least one feature that is also depicted in other images and further based on a regression model that identifies a degree of contribution of the at least one feature to asset scores.

17. A non-transitory computer readable medium embodying programmed instructions which, when executed by a processor, are operable for performing a method comprising:
storing images in a memory;
distributing the images via an interface coupled for communication with a network for consumption by members of an audience at remote devices;
for each of the images:
determining a look-back period;
acquiring metrics indicating at least two different types of consumption of the image by the audience during the look-back period; and
calculating an asset score for the image that indicates a popularity of the image and is based on the metrics indicating the at least two different types of consumption, wherein the asset score comprises a weighted combination of the metrics of the at least two different types of consumption, and each of the metrics has its own weight, and wherein asset scores for images in different brands are calculated concurrently in real-time using different weighted combinations of the metrics;
presenting asset scores via a Graphical User Interface (GUI) for review by a user, wherein the GUI is arranged and color coded based on the asset scores; and
storing the asset scores in the memory as metadata for the images.

18. The medium of claim 17 wherein the method further comprises:
determining an expected range of asset scores for the image based on historical asset scores for the image, wherein the expected range comprises a range occupied by more than half of prior asset scores for the image during a predefined period;
determining that a current asset score for the image is not within the expected range; and
generating a notification in response to determining that the current asset score is not within the expected range.

19. The medium of claim 17 wherein:
the at least two different types of consumption are selected from the group consisting of: views, downloads, shares, clicks, conversion, likes, searches, comments, and tags used by audience members in relation to the image, and
the metrics are selected from the group consisting of: a count of views during the look-back period, a count of downloads during the look-back period, a count of shares during the look-back period, a count of clicks during the look-back period, a count of conversions during the look-back period, a value of conversions during the look-back period, a count of likes during the look-back period, and a count of searches during the look-back period.

20. The medium of claim 17 further comprising:
the images are stored in a library that indicates depicted features for each image, and the features are selected from the group consisting of: a size of the image in memory, dimensions of the image, and depicted features found within the image, an applied filter, a file type, Multipurpose Internet Mail Extensions (MIME) type, color palette, bit depth, rendering technique, background color, compression algorithm, aperture of a camera used to create the image, contrast level of the image, primary hue of the image, lens information of a camera used to create the image, pixel information, saturation information, and vibrance information, and
the method further comprises generating a chart indicating estimated contributions of features to asset scores.

21. The medium of claim 17 further comprising:
identifying groups of images that are within the same brand; and
normalizing asset scores within each of the groups to be within a desired range of values between zero and a maximum value, by, for each group: selecting the image in the group having a highest asset score, and for each image in the group, multiplying the asset score by the maximum value and dividing by the highest asset score.

22. The medium of claim 17, wherein the method further comprises:
calculating a historical series of asset scores for the image over time;
forecasting asset scores for the image in the future based on the historical series of asset scores;
determining confidence limits which indicate a range of estimated asset scores within a predefined confidence interval;

presenting the range of estimated asset scores and confidence limits within a chart displayed at the GUI, wherein the confidence limits each depict a predefined confidence interval from an estimated asset score at a point in the future, and the chart increases a span of the confidence limits as a range of the forecast increases; and increasing a span of the confidence limits as a range of the forecast increases.

23. The medium of claim 17, wherein the method further comprises:

operating a machine learning model to predict asset scores for images, the machine learning model comprising a neural network having layers with nodes that identify features found within images, and also having layers that predict the contribution of each feature to the score of an image.

24. The medium of claim 17, wherein the method further comprises:

receiving a new image;

identifying at least one feature depicted within the new image that is also depicted in other assets having known asset scores; and predicting an asset score for the new image based on the at least one feature that is also depicted in other images and further based on a regression model that identifies a degree of contribution of the at least one feature to asset scores.

\* \* \* \* \*